Aug. 30, 1932.  J. A. DE TURK  1,874,698
MOLDING MACHINE
Filed Nov. 14, 1924   7 Sheets-Sheet 5
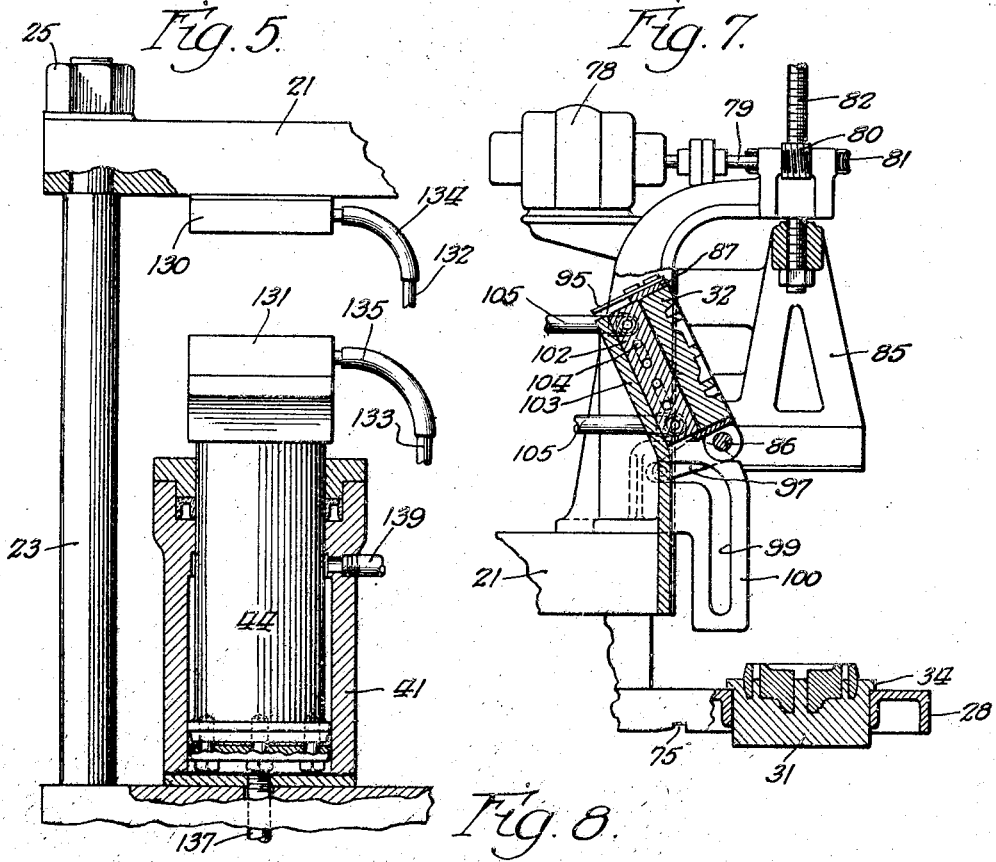
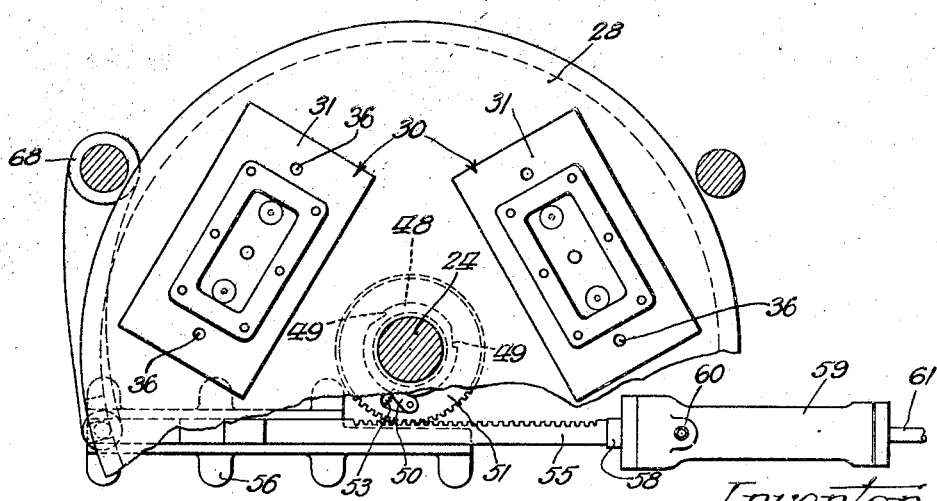
Inventor:
Jeremiah Amos DeTurk.
By: H. W. Patterson
Atty.

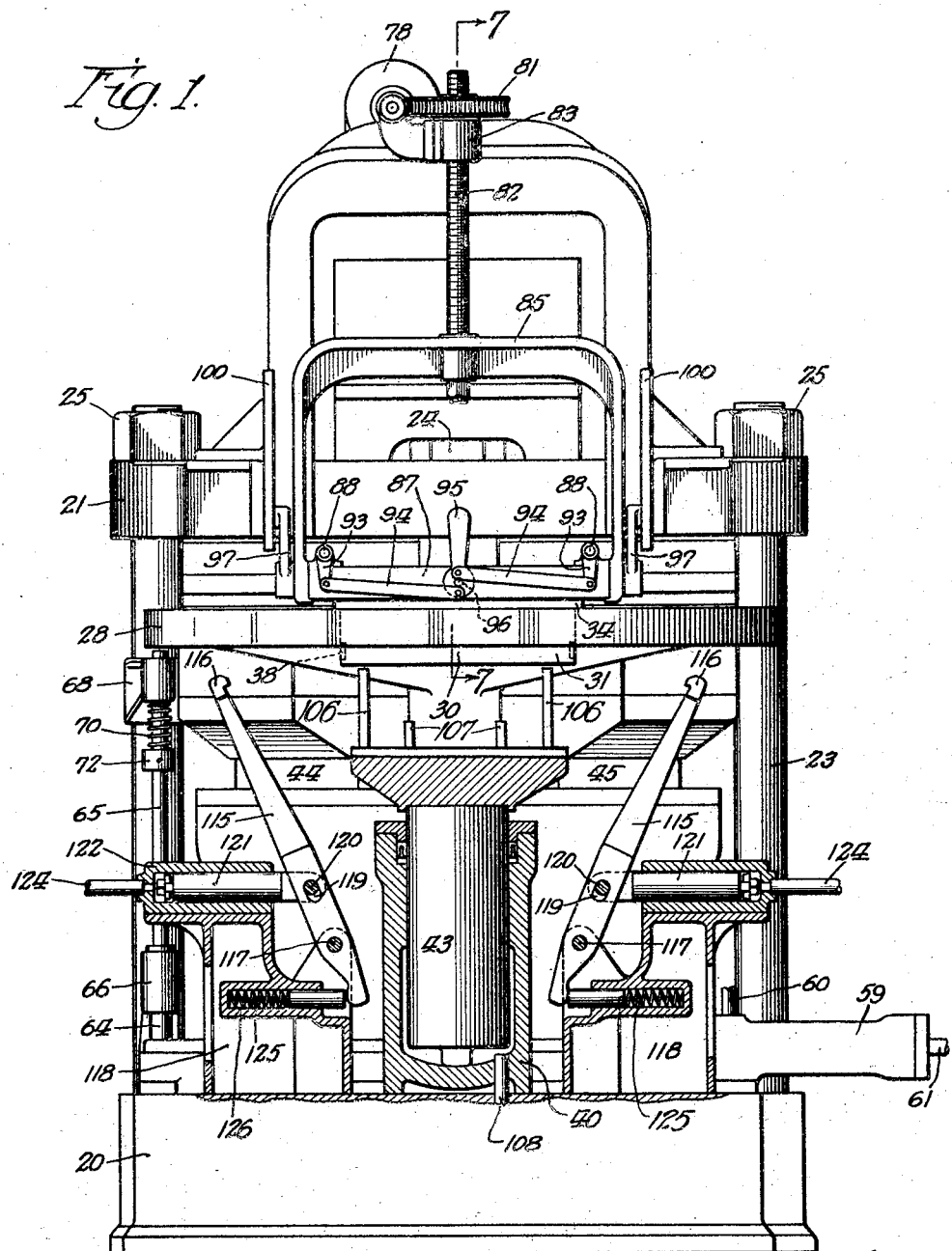

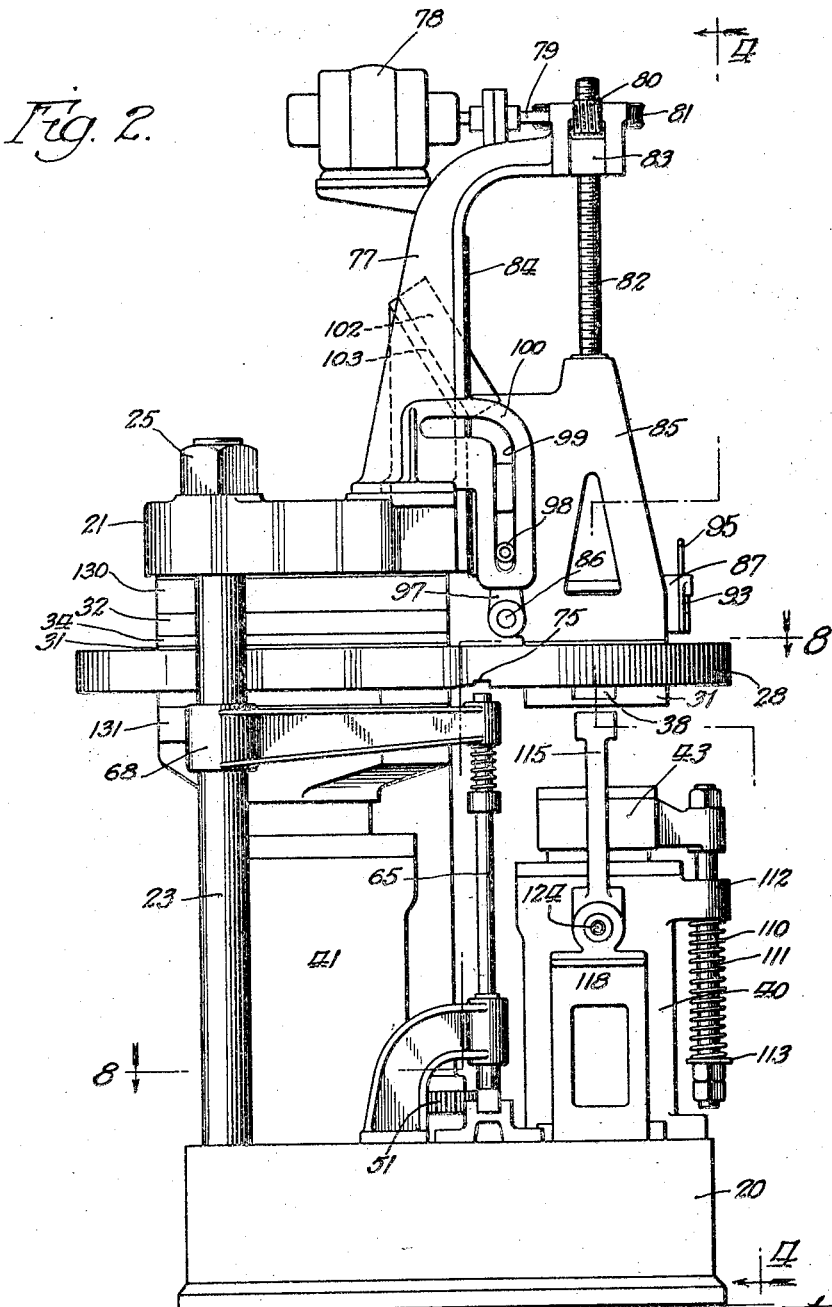

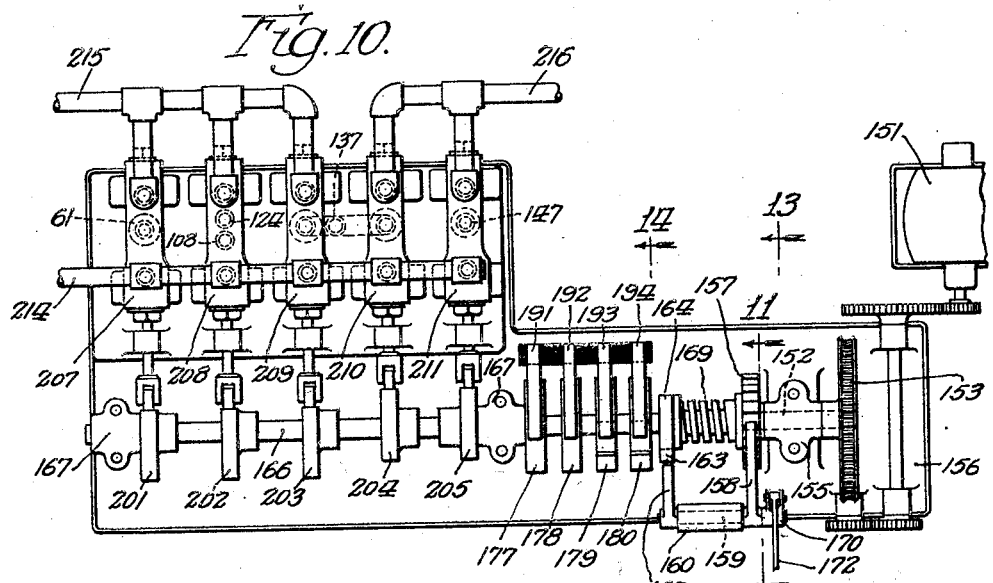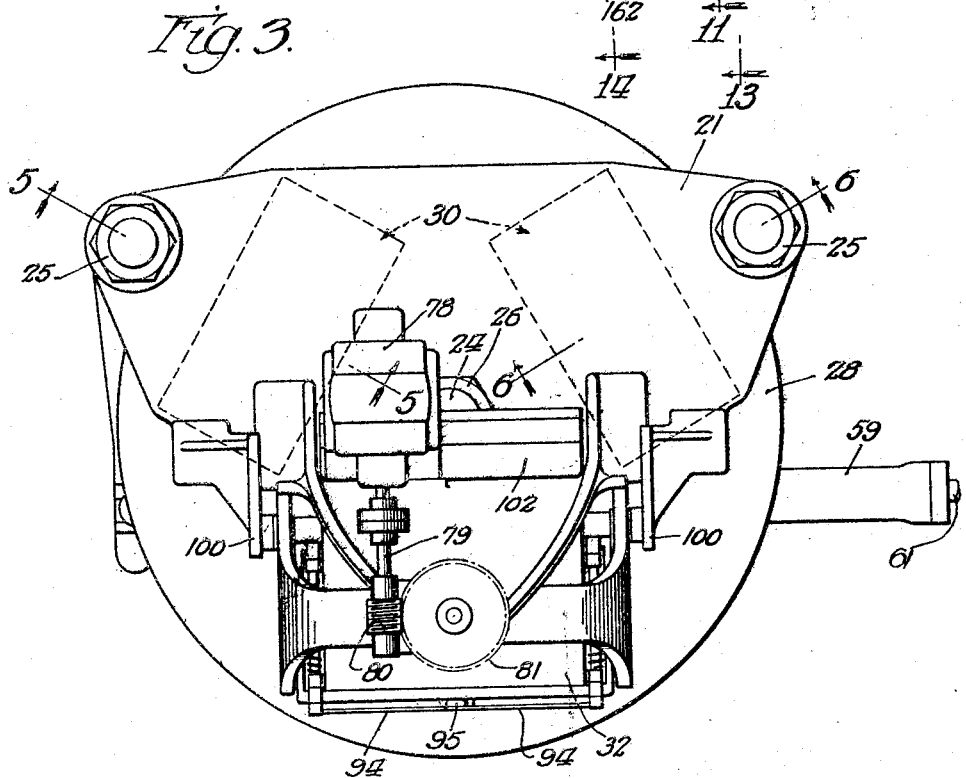

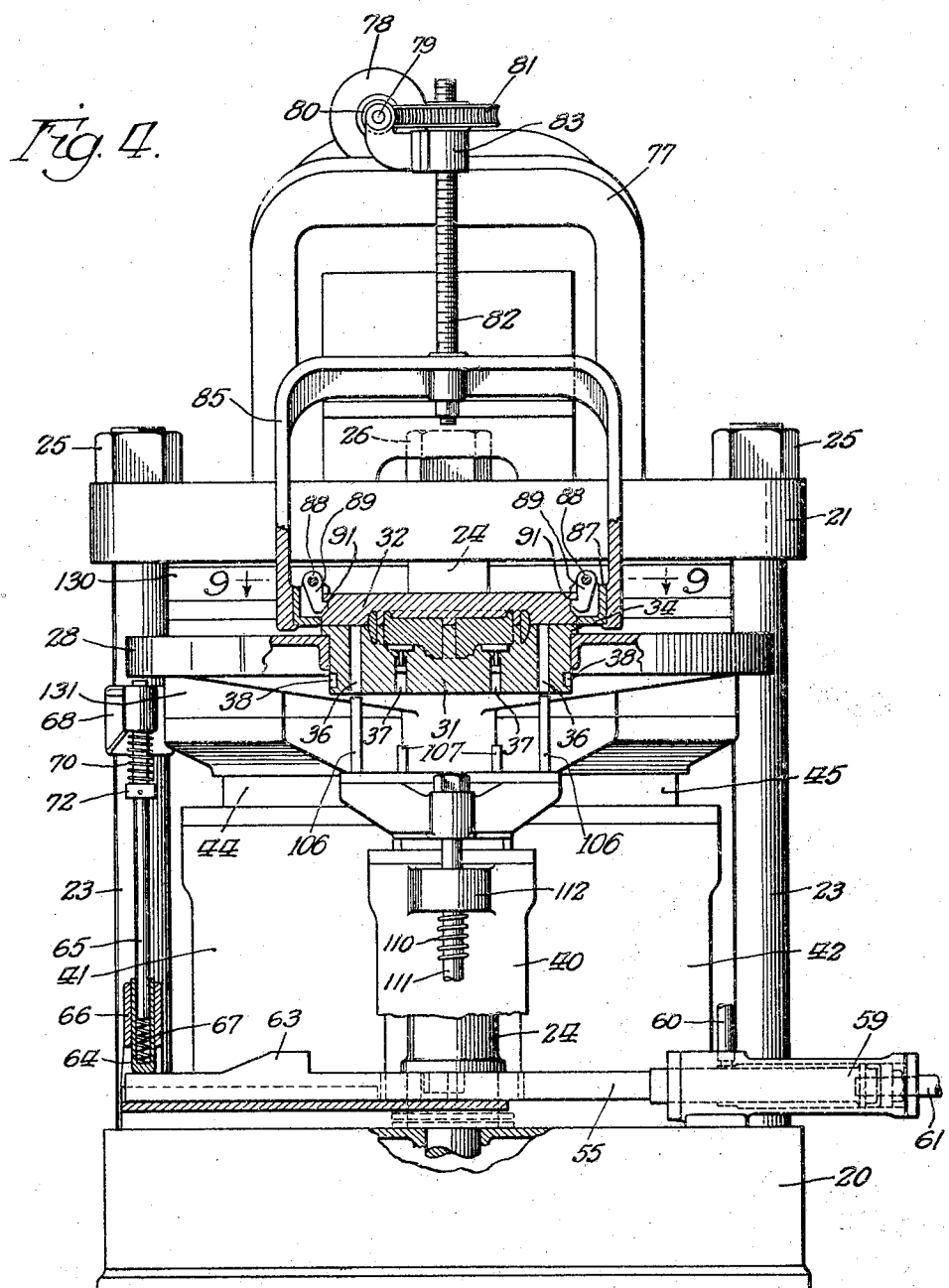

Aug. 30, 1932.        J. A. DE TURK         1,874,698
MOLDING MACHINE
Filed Nov. 14, 1924        7 Sheets-Sheet 6
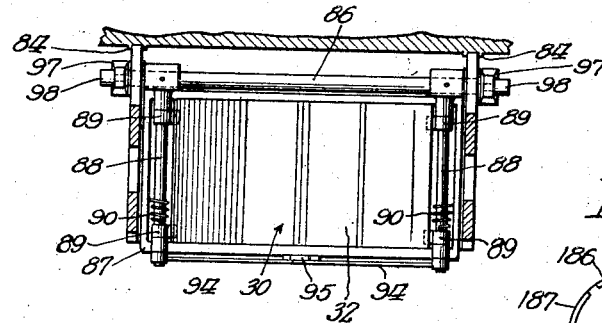
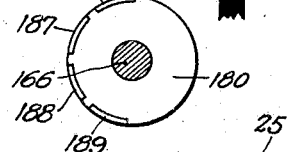
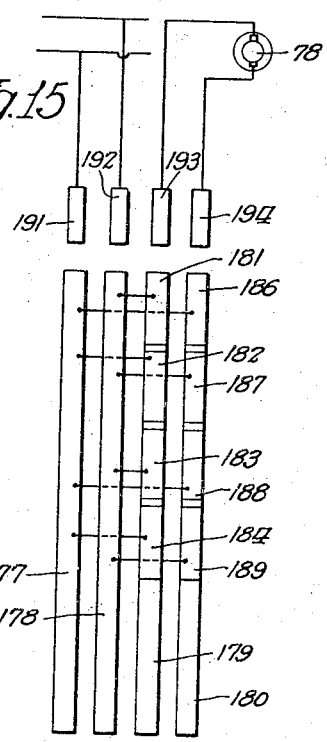
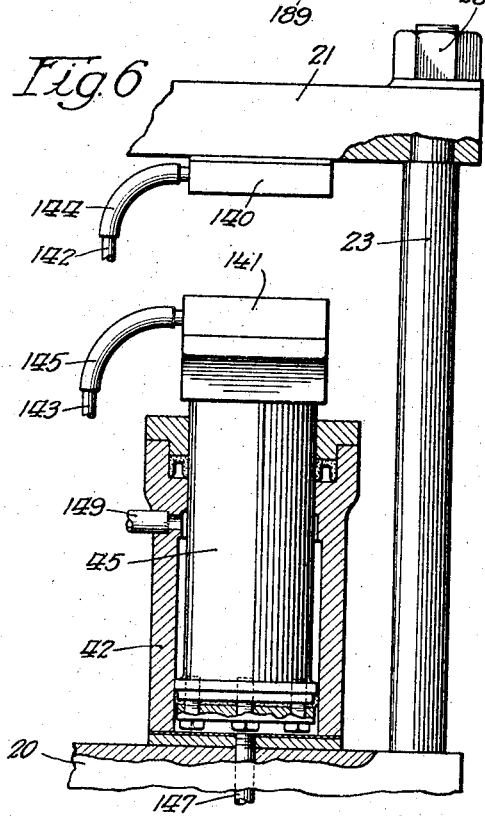
Inventor
Jeremiah Amos De Turk
By
Atty.

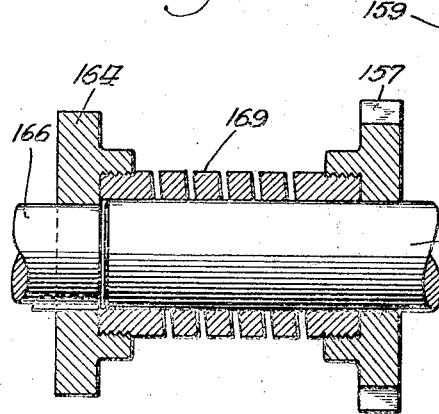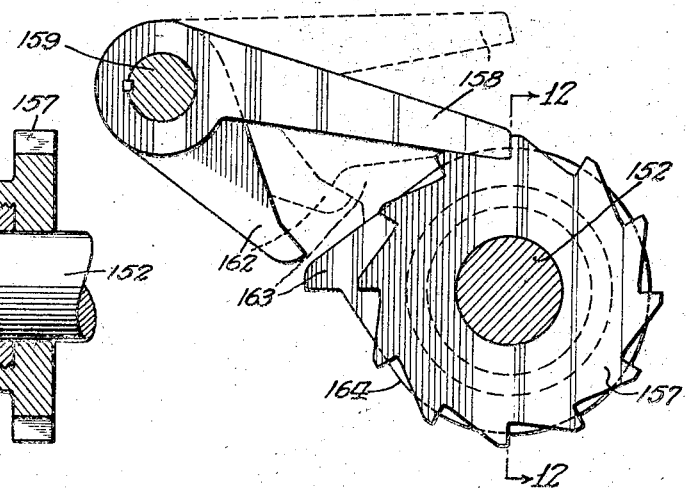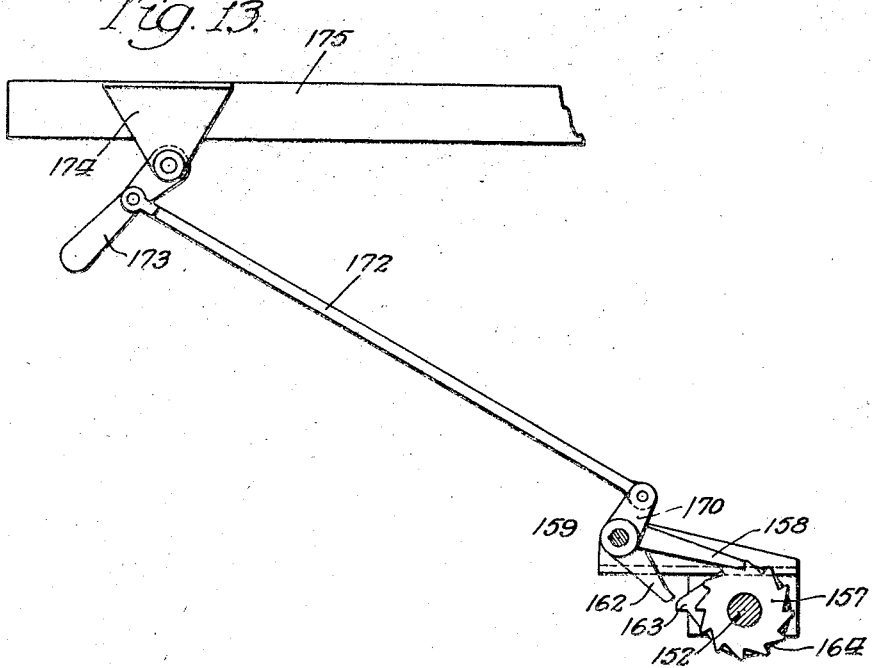

Patented Aug. 30, 1932

1,874,698

UNITED STATES PATENT OFFICE

JEREMIAH AMOS DE TURK, OF LA GRANGE, ILLINOIS, ASSIGNOR TO WESTERN ELECTRIC COMPANY, INCORPORATED, OF NEW YORK, N. Y., A CORPORATION OF NEW YORK

MOLDING MACHINE

Application filed November 14, 1924. Serial No. 749,825.

This invention relates to molding machines, and more particularly to machines for molding articles from plastic material.

The primary object of the invention is to provide an improved molding machine which will produce a relatively large number of molded articles in a given period of time with a minimum amount of attention and supervision.

One form of the invention is embodied in a molding machine having three separable multi-member molds slidably mounted in a support rotatable by hydraulic means to successively advance each mold into three positions. A mold in the first position is charged with moldable material and closed. The machine is then set in motion under the control of a cyclic timing means and when the filled mold advances into the second position it is heated and after being subjected to a predetermined pressure for a predetermined length of time, is subjected to a different pressure for a predetermined length of time. The mold then advances to a third position, wherein it is cooled and subjected to a predetermined pressure for a predetermined length of time, whereupon it is returned to the first position. In this position the mold is opened, the molded product is loosened and removed from the cavity, one of the mold members engaging an element to preheat it for the next molding cycle. Each position is provided with individual hydraulic means serving to apply the pressures in the second and third positions, separate the members and loosen the product in the first position.

Other objects and features of the invention will become apparent as the detailed description progresses, reference being had to the accompanying drawings, wherein Fig. 1 is a front view, partly in section, of a machine embodying the invention;

Fig. 2 is a side view of the improved molding machine;

Fig. 3 is a plan view of the improved molding machine;

Fig. 4 is a sectional view taken on line 4—4 of Fig. 2;

Fig. 5 is a sectional view taken on line 5—5 of Fig. 3;

Fig. 6 is a sectional view taken on line 6—6 of Fig. 3;

Fig. 7 is a sectional view taken on line 7—7 of Fig. 1, certain parts of the machine being shown in changed positions;

Fig. 8 is a sectional view taken on line 8—8 of Fig. 2;

Fig. 9 is a sectional view taken on line 9—9 of Fig. 4;

Fig. 10 is a plan view of mechanism which times the operations of the improved molding machine;

Fig. 11 is a sectional view taken on line 11—11 of Fig. 10;

Fig. 12 is a sectional view taken on line 12—12 of Fig. 11;

Fig. 13 is a sectional view taken on line 13—13 of Fig. 10;

Fig. 14 is a sectional view taken on line 14—14 of Fig. 10, and

Fig. 15 is a diagram of a circuit which forms a part of the improved molding machine.

In the drawings, 20 is a base and 21 is a frame member which is held in spaced relation with respect to the base 20 by rods 23 and a centrally disposed post 24, the frame member 21 being secured to the rods 23 and the post 24 by nuts 25 and 26, respectively. Rotatably journaled on the post 24 is a plate 28 in which are slidably mounted three molds 30 each comprising a molding member 31 and a molding member 32. Each molding member 31 may be supported upon the plate 28 by a flange 34 formed integral with the molding member and each molding member 31 is provided with bores 36 and 37 and recesses 38 for a purpose which will presently appear (Fig. 4).

Mounted upon the base 20 are three hydraulic cylinders 40, 41, and 42 having rams 43, 44, and 45, respectively. The hydraulic cylinders 40, 41, and 42 are equi-distantly spaced from each other and from the post 24 so that the molds 30 which are also equi-distantly spaced from each other and from the post 24 may be aligned with the cylinders.

Depending from the plate 28 and secured thereto is a sleeve 48 having three notches 49 engageable by a pawl 50 which is pivoted upon a gear 51 rotatably journaled upon the sleeve. A compression spring 53 urges the pawl 50 into the notches 49. Meshing with the gear 51 is a rack 55 which is slidably journaled in a bracket 56 and is secured to the forward end of a plunger 58 disposed in a hydraulic cylinder 59 to which liquid under pressure is supplied through pipes 60 and 61 to reciprocate the plunger 58 and the rack 55, the pipe 60 being connected directly to a source (not shown) of liquid under pressure. The rack 55, when reciprocated, oscillates the gear 51 so that the pawl 50 will engage the notches 49 and advance the plate 28 one hundred and twenty degrees in a clockwise direction (Fig. 4).

Projecting from the rack 55 is a lug 63 adapted to engage a shoe 64 when the rack is advanced. The shoe 64 is slidably mounted on the lower end of a rod 65 and is also slidably mounted in a bracket 66 secured to the base 20. Interposed between the rod 65 and the shoe 64 is a compression spring 67 which urges the shoe toward the rack 55. The upper end of the rod 65 is slidably journaled in a bracket 68 secured to one of the rods 23. A compression spring 70 interposed between the bracket 68 and a collar 72 secured to the rod 65 urges the rod toward the rack 55. The construction is such that when the rack 55 is advanced the lug 63 will engage the shoe 64 and compress the springs 67 and 70 to bring the upper end of the rod 65 into engagement with the under surface of the plate 28. When the plate 28 has been rotated sufficiently to bring one of three notches 75 in the plate in alignment with the rod 65, the rod will enter the notch and lock the plate against further rotation.

Aligned with the hydraulic cylinder 40 and mounted upon the frame member 21 is a bracket 77 carryng an electric motor 78 adapted to drive a shaft 79 which is journaled in the bracket 77 and has rigidly secured to it a worm 80 meshing with a worm gear 81 threaded upon a vertically disposed screw 82, the screw 82 being slidably journaled in a block 83 mounted upon the bracket 77. Rigidly secured to the lower end of the screw 82 and engaging ways 84 formed upon the bracket 77 is a slide 85 journaling a shaft 86 which has rigidly secured to it a tilting frame 87 (Figs. 4 and 9). Journaled in the tilting frame 87 are shafts 88 carrying dogs 89 which are urged by springs 90 into positions wherein they may engage recesses 91 in the molding members 32. Secured to the outer end of each shaft 88 is a lever 93 which levers are connected by links 94 to a lever 95 pivotally mounted upon the tilting frame as at 96. The lever 95 may be manipulated by the operator to withdraw the dogs 89 from the recesses 91 against the action of the springs 90.

Secured to the ends of the shaft 86 are levers 97 having anti-friction rollers 98 disposed in cam slots 99 of a pair of brackets 100 mounted upon the frame member 21. The cam slots 99 are so designed that if the slide 85 is moved upwardly the levers 97 and the shaft 86 will bring the tilting frame 87 into the position wherein it is shown in Fig. 7 and wherein it is disposed in close proximity to a heating plate 102 secured to a bracket 103 mounted upon the frame member 21, the heating plate 102 being provided with passages 104 through which a heated fluid may be passed by way of pipes 105 connected to any suitable supply (not shown) of heated fluid. The function of the heating plate 102 is to preheat the molding members 32. Thus, when a mold is brought into the position wherein it is aligned with the slide 85, the motor 78 will be actuated by means hereinafter described to lower the screw 82 and the slide 85 through the medium of the worm 80 and the worm gear 81 until the dogs 89 engage the recesses 91. The motor is then reversed and the slide 85 is moved upwardly and carries the molding member 32 with it, the tilting member 87 being adapted to rest the molding member 32 upon the heating plate 102. A previously molded article may then be removed from the mold and a supply of moldable material may be placed into the molding member 31 for the following molding operation.

Pins 106 and 107 carried by the ram 43 are adapted to enter the bores 36 and 37, respectively. When a mold 30 has been brought into alignment with the hydraulic cylinder 40, liquid under pressure is admitted to the hydraulic cylinder 40 through a pipe 108 which causes the ram 43 to move upwardly until the pins 106 and 107 engage the molding member 32 and the molded product, respectively, in the mold cavity, the arrangement being such that the pins 106 will first separate the molding member 32 from the molding member 31 and the pins 107 will then loosen the molded product from the molding member 31. The ram 43 is retracted by a compression spring 110 disposed around a rod 111 which is slidably journaled in a lug 112 formed integral with the hydraulic cylinder 40 and is rigidly secured to the ram 43, the spring 110 being interposed between the lug 112 and a washer 113 secured to the rod 111.

To hold the molding members 31 against displacement relative to the plate 28 when the molds are being opened a pair of levers 115 are adapted to be brought into positions wherein jaws 116 formed upon the levers will engage the recesses 38 (Fig. 1). Each lever 115 is pivotally mounted intermediate its ends upon a pin 117 secured in one of a pair of brackets 118 which are mounted upon the base 20. Engaging a slot 119 in each lever 115 is a pin 120 carried in the forward end of a plunger 121 slidably journaled in a hydraulic cylinder 122 which is mounted upon the associated bracket 118. Liquid under pressure may be admitted to the cylinders 122 through pipes 124 to so displace the plungers 121 that the levers 115 will be brought into positions wherein their jaws 116 engage the recesses 38, the levers being subsequently withdrawn from these positions by compression springs 125 disposed in recesses 126 formed in the brackets 118.

A heating plate 130 secured to the underside of the frame member 21 is aligned with a heating plate 131 carried by the ram 44, the heating plates 130 and 131 being of the same type as the heating plate 102 and being supplied with heated liquid from any suitable source (not shown) through pipes 132 and 133, respectively, which are connected to the heating plates 130 and 131 by sections 134 and 135, respectively, of flexible tubing. When a mold 30 is positioned between the heating plates 130 and 131, fluid under pressure may be admitted to the hydraulic cylinder 41 through a pipe 137 to cause the ram 44 to hold the molding members 31 and 32 of the mold in pressing engagement with each other between the heating plates 130 and 131 so that the plastic compound on the mold is simultaneously subjected to heat and pressure. A pipe 139 connects the hydraulic cylinder 41 directly with any suitable supply (not shown) of liquid under pressure so that the ram 44 will be retracted whenever pressure in the pipe 137 is relieved.

A chilling plate 140 secured to the underside of the frame member 21 is aligned with a chilling plate 141 carried by the ram, the chilling plates 140 and 141 being substantially of the same type of construction as the heating plate 102 and being supplied with liquid from any suitable source (not shown) through pipes 142 and 143 which are connected to the chilling plates 140 and 141 by sections 144 and 145, respectively, of flexible tubing (Fig. 6). When a mold 30 is positioned between the chilling plates 140 and 141, fluid under pressure may be admitted to the hydraulic cylinder 42 through a pipe 147 to cause the ram to hold the molding members 31 and 32 in pressing engagement with each other between the chilling plates 140 and 141 so that the plastic compound in the mold is simultaneously cooled and subjected to pressure. A pipe 149 connects the hydraulic cylinder with any suitable supply (not shown) of fluid under pressure so that the ram 45 will be retracted whenever pressure in the pipe 147 is relieved.

The mechanism for timing the various operations of the above described apparatus may be located at any convenient point and comprises an electric motor 151 adapted to drive a shaft 152 through suitable reduction gearing indicated at 153 (Fig. 10). The shaft 152 is journaled in a bearing 155 mounted upon a base plate 156 and has rotatably mounted upon it a ratchet 157 engageable by a pawl 158 secured to a shaft 159 which is journaled in a bearing 160 mounted upon the base plate 156. Also secured to the shaft 159 is a dog 162 adapted to engage a finger 163 formed integral with a disc 164 keyed to a shaft 166, the axis of which is coincident with the axis of the shaft 152. The shaft 166 is journaled in bearings 167 mounted upon the base plate 156. The collar 164 is connected to the ratchet 157 by a spring 169 which is disposed around the shaft 152 and has its ends threaded into the collar and the ratchet. Normally the spring 169 frictionally engages the shaft 152 and will impart the rotation of that shaft through the collar 164 to the shaft 166, the ratchet 157 rotating in unison therewith. The pawl 158 may be employed to prevent rotation of the ratchet 157 so that if the shaft 152 is rotated the spring 169 will be unwound a small amount and will be prevented from frictionally engaging the shaft 152 with sufficient force to drive the collar 164 and the shaft 166. If the pawl 158 is brought into the position wherein it is shown in dotted lines in Fig. 11 the dog 162 will be disposed in the path of the finger 163 and upon engagement therewith will be brought into the position wherein it is shown in full lines in Fig. 11, thus causing the pawl 158 to again engage the ratchet 157. The means for withdrawing the pawl 158 from engagement with the ratchet 157 comprises a lever 170 affixed to the shaft 159 and connected by a link 172 to a lever 173 pivotally mounted upon a bracket 174 secured to any suitable fixture 175.

Constrained to rotate with the shaft 166 are slip rings 177 and 178 and commutators 179 and 180. As diagrammatically illustrated in Fig. 15, the commutator 179 comprises commutator bars 181, 182, 183, and 184, and the commutator 180 comprises commutator bars 186, 187, 188, and 189. The commutator bars 181, 187, 183, and 189 are electrically connected by suitable conductors to the slip ring 178, the commutator bars 186, 182, 188, and 184 being electrically connected by suitable conductors to a slip ring 177. Brushes 191, 192, 193, and 194, respectively, engage the slip rings 177 and 178 and the commutators 179 and 180. The brushes 191 and 192 are connected to any suitable source (not shown) of electrical energy and the brushes 193 and 194 are connected to the motor 78, the arrangement being such that the motor 78 will be operated to lower and raise the slide 85 two times for each revolution of the shaft 166.

Rigidly secured to the shaft 166 are cams 201 to 205, inclusive, which control valves indicated by the reference characters 207 to 211, inclusive, one valve being associated with each cam. The valve 207 when operated by the cam 201 alternately connects a waste water pipe line 214 and a hydraulic supply line 215 to the pipe 61. The valve 208 when operated by the cam 202 alternately connects the waste water line 214 and the hydraulic supply line 215 to the pipe 108 and the pipes 124. In a like manner, the valve 209 is adapted to alternately connect the pipe 137 to the waste water line 214 and the hydraulic supply line 215, the pipe 137 being also alternately connected to the waste water line 214 and the hydraulic supply line 216 by the valve 210. The valves 209 and 210 and their cooperating cams are so designed that the hydraulic supply lines 215 and 216 cannot be placed in communication with each other. The valve 211 alternately connects the pipe 147 with the waste water line 214 and the hydraulic supply line 216. The pressure in the hydraulic supply line 216 is preferably several times greater than the pressure in the hydraulic supply line 215.

In the operation of the machine the motor 151 is first connected to any suitable source (not shown) of electrical energy whereby it will be operated continuously and the particular mold 30 which is aligned with the hydraulic cylinder is charged with suitable plastic compound. The lever 173 is manipulated to disengage the pawl 158 from the ratchet 157 so that the spring 169 will frictionally engage the shaft 152 and cause the shaft 166 to make one revolution with the shaft 155. As the shaft 166 revolves, the brushes 193 and 194 contact the commutator bars 181 and 186, respectively, and the motor 78 lowers the slide 85 to bring the molding member 32 into place upon the molding member 31. The brushes 193 and 194 then contact the commutator bars 182 and 187, respectively, causing a reversal of the motor to raise the empty slide 85, the handle 95 being manipulated to draw the dogs 89 out of engagement with the recesses 91. The cam 201 operates the valve 207 to connect the hydraulic cylinder 59 with the hydraulic supply line 215 so that the rack 55 is advanced to rotate the plate 28 through the medium of the gear 51, the pawl 50 and the notches 49 and the sleeve 48. When the plate 28 has been advanced a distance sufficient to bring the mold into alignment with the hydraulic cylinder 41 the rod 65 cooperates with one of the notches 75 to lock the plate against further rotation. The valve 209 is then operated to connect the hydraulic supply line 215 with the hydraulic cylinder 41, and the ram 44 is forced upwardly to clamp the molding members 31 and 32 between the heating plates 130 and 131. After the plastic compound in the mold has been subjected to heat and pressure for a predetermined period of time, the valve 210 is operated to connect the hydraulic cylinder 41 with the hydraulic supply line 216 so that the moldable compound is subjected to a higher pressure for another predetermined period of time. The finger 163 then engages the dog 162 and rotates the shaft 159 to bring the pawl 158 into engagement with the ratchet 157 and the driving engagement between the shafts 152 and 166 is broken. During the time this mold is subjected to heat and pressure the following mold in alignment with the hydraulic cylinder 40 is charged and closed in the manner above described and the lever 173 is again employed to effect the driving engagement between the shafts 152 and 166. The mold which has been subjected to heat and pressure is then advanced with the plate 28 to a position wherein it is aligned with the hydraulic cylinder 42, the plate 28 being indexed to this position by the mechanism comprising the rod 65. The valve 211 then connects the hydraulic cylinder 42 with the hydraulic supply line 216, and the ram 45 causes the mold to be clamped between the chilling plates 140 and 141 for a predetermined period of time, after which, the connections between the shafts 152 and 156 are again broken. Then after the third mold has been charged the lever 173 is manipulated to set the machine in cyclic operation and the chilled mold is returned to the position wherein it is aligned with the hydraulic cylinder 40. When the chilled mold is in the position in which it is aligned with the hydraulic cylinder 40, the cam 202 operates the valve 208 to connect the hydraulic cylinders 40 and 122 to the hydraulic supply line 215 so that the lower mold member 31 will be held in place by the jaws 116 while the pins 106 and 107 moving with the ram 43 lift the upper mold member and loosen the molded article. The brushes 193 and 194 then contact with the commutator bars 183 and 188 and the motor 78 lowers the slide 85 until the dogs 89 engage the recesses 91. The brushes 193 and 194 then contact with the commutator bars 184 and 189 and the motor 78 is reversed to bring the molding member 32 into contact with the heating plate 102, the molding members 31 and 32 having been previously separated by the pins 106 and the molded product having been loosened from the mold by the pins 107 in the manner described above. This series of operations is identical for each mold 30, it being necessary to manipulate the lever 173 three times to subject the mold and the plaster compound therein to a complete cycle of operations.

The machine may be employed to mold articles from any plastic moldable compound as for instance any synthetic resinous material requiring the application of heat and pressure to cure the material. For economy and to prevent injury to metallic inserts and the like, the initial pressure to which the compound is subjected during the heating operation is less than the pressure required to produce perfectly molded and finished articles. The low pressure permits the plastic compound to soften and to distribute itself in the mold cavity. In the preferred embodiment of the invention the moldable compound is subjected to an initial pressure, approximating five hundred pounds per square inch of surface, and is then subjected to a pressure approximating two thousand pounds per square inch of surface, both pressures being applied during the heating operation. The lower pressure may be applied during a period of time ranging from one to three minutes, the higher pressure being applied from three to ten minutes. During the cooling operation, the compound is preferably subjected to the highest pressure.

What is claimed is:

1. In a molding machine, a mold comprising a plurality of molding members, heating means, and means for displacing one of said molding members relative to the other and place it in contact with said heating means.

2. In a molding machine, a mold including a plurality of molding members, a rotating table designed to receive said molds, means for lowering one of said molding members to said table, means for displacing the free molding member comprising a gripping mechanism engaging said molding member, means for imparting a uni-directional movement to said mechanism, and means for actuating said last recited means in timed relation to the rotation of said table.

3. In a machine for molding articles from synthetic resins and the like, a plurality of sectional molds, a plurality of process stations in sequence, means to transfer a mold cyclically from station to station, operating means to open, unload and close a mold at one station, a heating means, means for placing one section of the opened mold in contact with the heating means, operating means to heat a mold and subject its contents to pressure at a second station, operating means to chill a mold and subject its contents to pressure.

4. In a molding machine, a mold comprising a plurality of sections, heating means, and means for displacing one of the mold sections relative to the other and for placing it in contact with the heating means, said mold section displacing means comprising a member movable in a guideway, means for moving the member, a member having an arcuate slot, a mold section engaging member pivotally supported by the movable member, and a guide member carried by the mold section engaging member and disposed within the arcuate slot.

In witness whereof, I hereunto subscribe my name this 28th day of October A. D., 1924.

JEREMIAH AMOS DE TURK.